United States Patent Office 3,689,307

Patented Sept. 5, 1972

3,689,307

GRADED RUBBER-URETHANE-ACRYLATE PAINT AND PAINTING PROCESS

Olin B. Johnson, Livonia, and Santokh S. Labana, Dearborn Heights, Mich., assignors to Ford Motor Company No Drawing. Filed Dec. 21, 1970, Ser. No. 100,475
Int. Cl. C08g *41/04, 22/00*
U.S. Cl. 117—93.31 18 Claims

ABSTRACT OF THE DISCLOSURE

A radiation-curable paint binder dispersion comprises the addition product of a hydroxy-functional, acrylic graded-rubber particle, a diisocyanate and a hydroxyalkyl acrylate and vinyl monomers. The dispersion is applied to a substrate as a paint film and cured thereon by exposure to an electron beam.

A unique, rubber-comprising, radiation-curable paint is provided by preparing a film-forming dispersion of vinyl monomers and the addition product of a hydroxy-functional, acrylic graded-rubber particle, a diisocyanate and a hydroxyalkyl acrylate. This dispersion when applied as a paint film to a substrate is crosslinkable thereon by ionizing radiation, e.g. an electron beam.

(I) Preparation of the graded rubber particle

The graded rubber particle has a core of crosslinked, elastomeric, acrylic polymer, an outer shell comprising methyl methacrylate and a hydroxy-functional acrylate and an intermediate layer which is a copolymer of the monomers used to form the outer shell.

The process for preparing these particulate materials is at least a two stage process. In one method of preparation, a major amount of monofunctional monacrylate is emulsion copolymerized in the first stage with a crosslinking amount of a di- or trifunctional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second stage monomeric component, i.e., a mixture of about 65 to about 99, preferably about 70 to about 95, mole percent methyl methacrylate and about 1 to about 35, preferably about 5 to about 30, mole percent of a hydroxyalkyl acrylate or a mixture of about 1 to about 35, preferably about 5 to about 30 mole percent hydroxyalkyl acrylate and about 65 to about 99, preferably 70 to 95 mole percent of a mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The polymerization process is continued to yeld a stable latex of relatively uniform particle size and composition. A surfactant is used in forming the emulsion and additional surfactant may be added simultaneously with the second stage monomeric component.

The latex is coagulated, washed, and dried to yield finely divided white powder suitable for use in this invention.

Generically, the particles are prepared from monomers that will provide a crosslinked, acrylic, rubber-like core and a glass-like polymeric outer shell at room temperature, e.g. 20°–30° C. The terms rubber-like and glass-like are, of course, meaningless except when used in reference to a specific temperature or temperature range. The particles should be formulated so that the core retains such rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably above 100° C.

The core is formed from a major amount of an alkyl monoacrylate and a crosslinking amount of a di- or trifunctional monomer containing two or more non-conjugated terminal ethylenic groups. The monofunctional, alkyl, monoacrylate is preferably an ester of a $C_2$–$C_8$ monohydric alcohol and acrylic acid, e.g., ethyl acrylate, butyl acrylate, hexyl acrylate 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylates.

Suitable crosslinking agents include, but not by way of limitation, 1,3 - butylene diacrylate, 1,3-butylene dimethacrylate, divinyl benzene, 1,6 - hexamethylene diacrylate, 1,6-hexamethylene dimethacrylate, 1,1,1 - trimethylolethane triacrylate, 1,1,1 - trimethylolethane trimethacrylate, 1,1,1-trimethylolpropane triacrylate, 1,1,1-trimethylolpropane trimethacrylate, 1,4 - dimethyolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol or a triester of such acids with a $C_2$–$C_8$, preferably $C_2$–$C_6$, trihydric alcohol.

In the first stage reaction, there is preferably employed about 80 to about 98 mole percent of a monofunctional monoacrylate and about 20 to about 2 mole percent of the cross-linking agent. In the second stage reaction, it is preferred to use a mixture of about 65 to about 99, preferably about 70 to about 95 mole percent methyl methacrylate and about 1 to about 35, preferably about 5 to about 30, mole percent of a hydroxyalkyl acrylate. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance being made up of monofunctional monacrylates, e.g., esters of $C_2$–$C_8$ monohydric alcohols and either acrylic or methacrylic acid, or monofunctional vinyl hydrocarbons such as styrene and methyl substituted styrenes, e.g., alpha methyl styrene. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2$–$C_6$ dihydric alcohol, or divinyl hydrocarbon, e.g. 1 to 30 mole percent of divinyl benzene or 1,3-butylene diacrylate. The physical properties of the outer shell may also be modified by replacing up to about 30 mole percent of the methyl methacrylate with acrylonitrile or methacrylonitrile.

The initial monomer charge is usually emulsified by one or more micelle-forming compounds composed of a hydrophobic part, such as a hydrocarbon group containing 8 or more carbon atoms, and a hydrophylic part, such as alkaline metal or ammonium carboxylate groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate; sodium stearate; sodium oleate; sodium alkyl aryl sulfonates, polyoxymethylene sulfates and phosphates; the ethylene oxide condensate with long chain fatty acids, alcohols, and mercaptans and the alkali metal salts of rosin acids. These materials and the techniques of their employment in emulsion formation and maintenance are well known to the art and have no unusual application here. As they are conventional materials employed in a conventional manner, further description and explanation is unecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promoters such as transition metal ions.

A chain transfer agent or a mixture of chain transfer agents may be added to the reaction medium to limit the molecular weight of the polymer. Such chain transfer agents are generally mercaptans such as dodecanethiol, benzenethiol, pentanethiol, and butanethiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded rubber particles above described and this method of preparation are disclosed by Ray A. Dickie and Seymour Newman in their patent application Ser. No. 100,464 filed of even date with this application.

In another method of preparation, hereinafter illustrated, the rubber particles are formed in an aliphatic hydrocarbon medium.

(II) The diisocyanate reactant

The preferred diisocyanate for use in this invention is toluene diisocyanate and this may be either the 2,4- or 2,6-isomer or a mixture thereof. This diisocyanate may be used without blocking or one of the isocyanate groups thereof may be blocked with caprolactam before use. One may also use other diisocyanates so long as one of the isocyanate groups is blocked with caprolactam or other suitable blocking agent. Representative of other diisocyanates which can be monoblocked and used herein are the following: 4,4'-diphenylmethane diisocyanate, 1-phenoxy-2,4-phenylene diisocyanate, 1-tert-butyl-2,4 phenylene diisocyanate, and 1-ethyl-2,4-phenylene diisocyanate. Such blocking allows for separate stage reactions of the two isocyanate groups. Other blocking agents such as phenols and tertiary butyl alcohol may also be used. The blocking agents are selected so that the blocked isocyanate group is converted to free isocyanate group in a temperature range of about 120° to about 170° C. Sometimes a catalyst such as triethylene diamine or stannous octoate may be advantageously used in 0.05 to 1 percent concentration (basis weight of reactants) to assist the deblocking process.

A diisocyanate can be monoblocked with caprolactam by reacting the two in toluene. When the first isocyanate group is blocked, the monoblocked product precipitates out of solution. See, Raymond R. Myers & J. S. Long, Film-Forming Compositions, vol. 1, Part I, p. 485, published by Marcel Dekker Inc., New York, U.S.A. (1961). The reason for using the monoblocked diisocyanates is to assure that only one of the isocyanate groups per diisocyanate molecule will react with the hydroxy-functionality of the rubber particle. The second will react with the hydroxyalkyl acrylate thereby providing the addition product with alpha-beta olefinic unsaturation. When an excess of diisocyanate is employed and not removed prior to introduction of the hydroxyalkyl acrylate, there will be formed a corresponding amount of the addition product of one mole diisocyanate and two moles hydroxyalkyl acrylate. This provides no problem since this material is copolymerizable with the other paint binder components, increases the concentration of urethane linkages in the resultant paint film and serves as a viscosity modifier.

(III) The hydroxyalkyl acrylate reactant

A hydroxyalkyl acrylate is reacted with the second diisocyanate groups in the next step of the process. This component is preferably employed in slight excess of the amount required to react with the remaining isocyanate groups. The preferred hydroxyalkyl acrylates are hydroxyethyl acrylate, hydroxyethyl methacrylate, hydroxypropyl acrylate, and hydroxypropyl methacrylate.

(IV) Vinyl monomers employed in the paint dispersion

The paint binder dispersion advantageously contains about 20 to about 90, preferably about 30 to about 65, weight percent vinyl monomers and about 10 to about 80, preferably about 35 to about 70, weight percent of the rubber-urethane-acrylate addition product. Monomer type and concentration provide one means for adjusting the viscosity of the paint solution to conform to the method of application desired, e.g., spray coating, roll coating, etc. In functional terms, the amount of vinyl monomer present is at least sufficient to convert the alpha-beta, olefinically unsaturated rubber-urethane-acrylate addition product into a crosslinked continuous coating on the surface of a substrate when a film of such coating dispersion is exposed to ionizing radiation of an electron beam.

Vinyl monomers employed may be monofunctional, monoacrylates formed by the esterification of acrylic or methacrylic acid and a $C_1$–$C_8$, preferably $C_1$–$C_6$, monohydric alcohol, e.g., methyl methacrylate, ethyl acrylate, butyl acrylate, butyl methacrylate, 2-ethyl hexyl acrylate, etc. The monomer mixture may also include a minor amount, e.g. 1 to 30 mole percent, of diacrylates, e.g. the diesters of acrylic or methacrylic acid and a $C_2$–$C_6$ diol such as 1,3-butylene, diacrylate, 1,3-butylene dimethacrylate, 1,6-hexamethylene diacrylate, 1,6-hexamethylene dimethacrylate, ethylene glycol diacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$–$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

(V) Preparation and application of the coating solution to a substrate

By adjusting the viscosity of the coating solution to a viscosity compatible with the desired method of coating, these coatings may be applied by any of the conventional methods, e.g., brushing, spraying, roll coating, curtain coating, flow coating, etc.

The viscosity of the paint binder solution can be adjusted by varying the molecular weight of the rubber-urethane-acrylate addition product. This may be accomplished by controlling the average number of functional groups per molecule through control of the concentration of the hydroxy alkyl acrylate constituent in the final portion of the monomer mixture introduced into the reaction medium when the graded rubber particle is produced. The viscosity may also be regulated by varying the relative concentration of the resin component with respect to the vinyl monomer component and/or by varying the relative concentrations of dissimilar monomers within the vinyl monomer component. The binder dispersion may be applied to the substrate essentially free of nonpolymerizable, organic solvents and/or diluents or it may be applied with the solvents and/or diluents in a method of application wherein the solvents and/or diluents are flashed off prior to polymerization.

The coatings may be applied to any substrate, e.g., metal, wood, glass, polymeric solids, etc. These coatings will ordinarily be applied to an average depth in the range of about 0.1 to about 4 mils, more commonly about 0.5 to about 2 mils.

(VI) Curing the coating

The films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation energy is applied at dose rates of about 0.1 to about 100 mrad per second on a workpiece, preferably moving workpiece, with the coating receiving a total dose in the range of about 1 to about 25, commonly about 8 to about 15 mrad.

The term "ionizing radiation" as employed herein means radiation having sufficient energy to remove an electron from a gas atom, forming an ion, hence radiation with minimum energy of, or equivalent to, about 5,000 electron volts. The preferred method of curing films of the instant paint binders upon the substrates to which they have been applied is by subjecting such films to a beam of polymerization effecting electrons which at its source of emission is within the range of, or equivalent to about 100,000 to about 500,000 electron volts. If irradiation is carried out in vacuum or at reduced pressure, this energy range may be considerably lower. In this method of curing, it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free, inert gas such as nitrogen or helium.

In this application, the term "paint" is meant to include finely ground pigment and/or filler in the binder, the binder without pigment and/or filler or having very little of the same, which can be tinted, if desired. Thus, the binder which is ultimately converted to a durable film resistant to conventional curing, can be all or virtually all that is used to form the film or it can be a vehicle for pigmentary and/or mineral filler material.

The abbreviation "mrad" as employed herein means 1,000,000 rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient.

The electron beam, which may be about 1/8 inch in diameter at this point, is then scanned in one direction to make a fan-shaped beam and then passed through a metal window, e.g., aluminum, aluminum-copper alloy, or magnesium-thorium alloy of about 0.003 inch thickness.

This invention will be more fully understood from the following examples:

EXAMPLE 1

(I) Graded rubber particles are prepared in aqueous medium using the following procedures: to 1,000 parts by weight water which has been boiled and cooled to room temperature under a nitrogen atmosphere are added 2.86 parts by weight sodium dodecyl sulfate dissolved in 35.7 parts by weight water and about 1/3 of a monomer mixture consisting of 521 parts butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is begun at a rate such that the temperature of the reaction mixture is maintained at 47° to 50° C. During the addition of the last two-thirds of the first monomer mixture, 5.72 parts by weight sodium dodecyl sulfate dissolved in 35.7 parts by weight water are added at a substantially constant rate. The reaction mixture is maintained at 47° to 50° C. for about 60 minutes prior to beginning simultaneous dropwise addition of a mixture of 1180 parts by weight methyl methacrylate and 425 parts by weight hydroxyethyl methacrylate, 30 parts by weight dodecyl mercaptan, and 2.86 parts by weight sodium dodecyl sulfate dissolved in 35.7 parts by weight water. This addition, which requires about 30 minutes, is carried out at such a rate that the temperature of the reaction mixture is at 47° to 50° C. Following this addition, the mixture is maintained at 47° to 49° C. for an additional two hours.

The emulsion is then coagulated by addition of 20 grams of concentrated hydrochloric acid solution and 100 ml. of water. The rubber particles are isolated by filtration and washed with methanol containing 1 weight percent of hydrochloric acid. The particles are then dried.

(II) Determination of the concentration of reactive hydroxyl groups on the surfaces of the particles is made by the well known method of analysis wherein the hydroxyl groups are reacted with acetic acid using a pyridine catalyst. The acetic anhydride is then back titrated with sodium hydroxide. For details, reference is made to A. Steyermark, Quantitative Organic Analysis, pp. 302–303, published by Blakiston Company, New York, Toronto, and Philadelphia (1951).

(III) The hydroxy-functional graded rubber particles prepared in I above are reacted with a diisocyanate using the following procedures: the hydroxy-functional particles in the quantity providing one mole of reactive hydroxyl groups on the collective surfaces thereof are suspended in toluene and 2,4-toluene diisocyanate, in the quantity necessary to provide about 3 isocyanate groups per each hydroxy group, is incrementally added at a rate slow enough to keep the temperature of the reaction mix below 32° C. After the initial exotherm subsides, the reaction mixture is stirred for one hour.

(IV) The rubber-diisocyanate adduct is reacted with a hydroxyalkyl acrylate using the following procedure: the temperature of the reaction mix is raised to about 45°C. and hydroxyethyl methacrylate monomer is added in slight excess (e.g. 5 to 7% excess) of that required to react with the unreacted isocyanate groups. It is added slowly and incrementally and the reaction is stirred continuously for several hours. The solvent is removed under vacuum until the solvent content of the product mix is less than 15%. The rubber-urethane-acrylate addition product, hereinafter referred to as resin, is ready for employment in coating compositions.

(V) Paint dispersions are prepared from the rubber-urethaneacrylate resin and vinyl monomers; the rubber-urethane-acrylate resin is divided into three fractions and each diluted with methyl methacrylate monomer to form three paint dispersions. The first paint dispersion contains about 75 weight percent rubber-urethane-acrylate resin and about 25 weight percent methyl methacrylate. The second paint dispersion contains about 50 weight percent of the rubber-urethane-acrylate and about 50 weight percent methyl methacrylate. The third paint dispersion contains about 25 weight percent of the rubber-urethane-acrylate resin and about 75 weight percent of methyl methacrylate.

(VI) Coating of substrates.—The dispersions prepared in V above are separately coated on substrates of steel, wood, glass and polymeric solid, i.e., acrylonitrile-butadiene-styrene copolymer, to an average depth of about 7/10 mil (0.0007 inch) and irradiated with an electron beam. The conditions of irradiation are as follows:

Potential—275 kv.
Current—30 milliamperes
Distance, emitter from workpiece—10 inches
Dose—10 mrad
Atmosphere—nitrogen

EXAMPLE 2

The procedure of Example 1 is repeated with the differences that an equimolar amount of ethyl acrylate is substituted for the butyl acrylate used in the first monomer mixture to form the core of the graded rubber particle and one-half of the methyl methacrylate used to form the coating dispersions with the rubber-urethane-acrylate addition product is replaced with an equimolar amount of styrene.

EXAMPLE 3

The procedure of Example 1 is repeated with the differences that an equimolar amount of 2-ethyl hexyl acrylate is substituted for the butyl acrylate used in the first monomer mixture to form the core of the graded rubber particle, the second monomer mixture used to form the shell of the graded rubber particle is a mixture of about 40 mole percent methyl methacrylate, 15 mole percent ethyl acrylate, 10 mole percent butyl methacrylate, 10 mole percent acrylonitrile and 25 mole percent hydroxyethyl acrylate, and the vinyl monomer component used to form the coating dispersion with the rubber-urethane-acrylate addition product is a mixture of 30 mole percent methyl methacrylate, 20 mole percent butyl methacrylate, 10 mole percent 2-ethyl hexyl acrylate, 20 mole percent styrene, and 20 mole percent vinyl toluene. The second monomer mixture is divided into four equal fractions each of which is added in increments. The hydroxyethyl acrylate is added to the reaction mixture with the last of these fractions.

EXAMPLE 4

The procedure of Example 1 is repeated with the differences that an equimolar amount of cyclohexyl acrylate is substituted for the butyl acrylate and an equimolar amount of 1,3-butylene diacrylate is substituted for the 1,3-butylene dimethacrylate used in the first monomer mixture to form the core of the graded rubber particle, the second monomer mixture used to form the shell of said graded rubber particle is a mixture of 30 mole percent methyl methacrylate, 10 mole percent styrene, 15 mole percent methacrylonitrile, 10 mole percent 1,3-butylene dimethacrylate, 5 mole percent vinyl acetate and 30 mole percent hydroxypropyl methacrylate, and the vinyl monomer component used to form the coating dispersion with the rubber-urethane-acrylate addition product is a mixture of 70 mole percent methyl methacrylate, 20 mole percent alpha methyl styrene and 10 mole percent 1,3-butylene dimethacrylate.

EXAMPLE 5

The procedure of Example 1 is repeated with the difference that an equimolar amount of 1,6-hexamethylene diacrylate is substituted for the 1,3-butylene dimethacrylate used in the first monomer mixture to form the core of the graded rubber particle.

EXAMPLE 6

The procedure of Example 1 is repeated with the differences that an equimolar amount of divinyl benzene is substituted for the 1,3-butylene dimethacrylate used in the first monomer mixture to form the core of the graded rubber particle, the second monomer mixture used to form the shell of said particle is a mixture of 50 mole percent methyl methacrylate, 10 mole percent acrylonitrile, 10 mole percent divinyl benzene, and 30 mole percent hydroxypropyl acrylate, and the vinyl monomer component used to form the coating dispersion with the rubber-urethane-acrylate addition product is a mixture of 70 mole percent methyl methacrylate, 20 mole styrene, and 10 mole percent divinyl benzene.

EXAMPLE 7

The procedure of Example 1 is repeated with the differences that a single paint dispersion is formed using 60 weight percent of the rubber-urethane-acrylate addition product and 40 weight percent of the methyl methacrylate.

EXAMPLE 8

The procedure of Example 1 is repeated with the difference that a single paint dispersion is formed using 40 weight percent of the rubber-urethane-acrylate addition product and 60 weight percent of the methyl methacrylate.

EXAMPLE 9

The procedure of Example 1 is repeated except for the differences that the second monomer mixture introduced into the reaction mixture to form the shell of the hydroxy-functional graded rubber product is a mixture of about 95 mole percent methyl methacrylate and about 5 mole percent hydroxyethyl methacrylate. The second monomer mixture is divided into 10 equal fractions each of which is added incrementally. The hydroxyethyl methacrylate is added to the reaction mixture with the last 1/10 of the monomer mixture.

EXAMPLE 10

The procedure of Example 1 is repeated except for the differences that the second monomer mixture introduced into the reaction mixture to form the shell of the hydroxy-functional graded rubber product is a mixture of about 85 mole percent methyl methacrylate and about 15 mole percent hydroxyethyl acrylate. The second monomer mixture is divided into 5 equal fractions each of which is added incrementally. The hydroxyethyl acrylate is added to the reaction mixture with the last 1/5 of the monomer mixture.

EXAMPLE 11

The procedure of Example 1 is repeated with the differences that the curing is carried out in a helium atmosphere and the potential of the electron beam upon exit from the electron window into such atmosphere is about 260 kv.

EXAMPLE 12

The procedure of Example 1 is repeated with the differences that the curing is carried out in a nitrogen atmosphere containing a minor amount of $CO_2$ and the potential of the electron beam upon existing from the electron window into such atmosphere is about 295 kv.

EXAMPLE 13

Substrates are coated in accordance with this invention using the following procedures:

(I) Graded rubber particles are prepared in an organic medium using the procedure set forth below:

(A) A mixture is formed of the following:

| Materials: | Grams |
|---|---|
| Ethyl acrylate | 400 |
| 1,3-butylene dimethacrylate | 100 |
| Dispersing agent [1] | 15 |
| AIBN [2] | 5 |

[1] An amphipathic copolymer (one portion soluble in the acrylic monomers and the other portion soluble in the solvent, e.g. dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.). The resulting material is then copolymerized with an equal amount of methyl methacrylate using AIBN initiator (9 g.) and butyl acetate solvent. This method of producing this dispersing agent is described in detail by K. E. J. Barratt and H. R. Thomas in Journal of Polymer Science, Part A 1, Volume 7, 2625 (1969). Other dispersing agents which are effective for stabilizing suspensions in hydrocarbon liquids may be used in place of the above described material.

[2] 2,2′ azobis (2-methyl propionitrile).

(B) The mixture of the above listed materials is added to 1,000 grams n-dodecane under nitrogen. The mix is warmed to 40° C. When the exotherm starts the temperature is allowed to rise to 80° C. The temperature is maintained at 80° C. for 30 minutes.

(C) The reaction mixture is maintained in a nitrogen atmosphere and there is added slowly with stirring a mixture of the following materials:

| Materials: | Grams |
|---|---|
| Methyl methacrylate | 320.0 |
| Hydroxyethyl methacrylate | 80.0 |
| Dispersing agent [1] | 3.0 |
| AIBN | 6.0 |
| n-Dodecane | 1000.0 |

[1] Same as I A (1).

(II) The hydroxy-functional graded rubber particles prepared in I above are reacted with a diisocyanate using the following procedure: the temperature of the reaction mixture is allowed to cool to 30° C. and there is slowly added 132 grams of 2,4-toluene diisocyanate. The temperature is maintained in the range of 30°–35° C. for 2 hours.

(III) There is added to the reaction mix 125 grams of hydroxyethyl methacrylate. The reaction mix is then heated at 45° C. for 4 hours. The rubber-urethane-acrylate addition product particles are separated from the solvent by filtration.

(IV) A paint dispersion is prepared using 40 parts by weight of the rubber-urethane-acrylate addition product and 60 parts by weight of an equimolar mixture of methyl methacrylate and styrene.

(V) Coating of substrates: the paint dispersion prepared in IV is sprayed upon substrates of steel, aluminum, glass, paper, wood and polymeric solid, i.e., polypropylene, to an average depth of about 1.5 mils and cured thereon by placing said substrates in a nitrogen atmosphere and exposing the coated surfaces to an electron beam (potential 275 kv.-current 30 milliamperes) until the coatings are crosslinked upon the surfaces of the substrates and are tack-free to the touch.

EXAMPLE 14

The procedure of Example 13 is repeated with the differences that an equimolar amount of 4,4′ diphenylmethane diisocyanate with one isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 15

The procedure of Example 13 is repeated with the differences that an equimolar amount of 1-phenoxy-2,4-phenylene diisocyanate with one isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 16

The procedure of Example 13 is repeated with the differences that an equimolar amount of 1-tert-butyl-2,4 phenylene diisocyanate with one isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 and the procedure of Section III of Example 13 is modified in that, as the hydroxyethyl methacrylate monomer is dispersed in the reacting mixture, the temperature of the reaction mixture is raised to about 150° C. and maintained at a temperature of about 150° C. while the reaction mixture is stirred for about 30 minutes.

EXAMPLE 17

The procedure of Example 13 is repeated with the differences that an equimolar amount of 1-ethyl-2,4-phenylene diisocyanate with one isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

The terms "acrylate" and "acrylates," when used herein without a modifier distinguishing between esters of acrylic acid and methacrylic acid, shall be understood to include both. This, of course, does not apply to the naming of a specific compound.

It will be understood by those skilled in the art that modifications can be made within the foregoing examples within the scope of the invention as hereinbefore described and hereinafter claimed.

We claim:

1. A rubber-urethane-acrylate addition product formed by reacting a first isocyanate group of a diisocyanate with a hydroxy-functional particle of graded rubber and reacting the remaining isocyanate group of said diisocyanate with a hydroxy alkyl acrylate, said particle of graded rubber consisting essentially of (1) about 10 to about 90 weight percent of a core of crosslinked acrylic polymer consisting of (a) a minor and crosslinking amount of a di- or tri-functional monomer containing 2 or more non-conjugated terminal ethylenic groups selected from divinyl benzene, a diester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and (b) a remainder consisting essentially of an ester of acrylic acid and a $C_2$–$C_8$ monohydric alcohol, said remainder constituting at a minimum about 80 mole percent of the core reactants, and (2) about 90 to about 10 weight percent of an outer shell having glass transition temperature at least 50°

C. above that of said core consisting essentially of the polymerization product of monomer mixtures selected from the group consisting of (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate, and (b) about 5 to about 30 mole percent of a hydroxy-functional acrylate selected from hydroxyethyl acrylate, hydroxyethyl methacrylate, hydroxypropyl acrylate and hydroxypropyl methacrylate and about 70 to about 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohols and 0 to 30 mole percent of a monomer selected from acrylonitrile, methacrylonitrile and vinyl acetate.

2. A rubber-urethane-acrylate addition product in accordance with claim 1 wherein said core is a crosslinked acrylic polymer consisting essentially of butyl acrylate and 1,3-butylene dimethacrylate.

3. A rubber-urethane-acrylate addition product in accordance with claim 1 wherein said core is a crosslinked acrylic polymer consisting essentially of 2-ethyl hexyl acrylate and 1,3-butylene dimethacrylate.

4. A rubber-urethane-acrylate addition product in accordance with claim 1 wherein said hydroxyalkyl acrylate is selected from hydroxyethyl acrylate, hydroxyethyl methacrylate, hydroxypropyl acrylate and hydroxypropyl methacrylate and said graded rubber particle has a diameter in the range of about 0.04 to about 1 micron.

5. A rubber-urethane-acrylate addition product in accordance with claim 1 wherein said diisocyanate is toluene diisocyanate.

6. A rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups selected divinyl benzene, a diester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and (b) a remainder consisting essentially of a monofunctional monoacrylate, said remainder constituting at a minimum about 80 mole percent of the core reactants, and (2) about 90 to about 10 weight percent of an outer shell having glass transition temperature above that of said core and consisting essentially of the polymerization product of monomers selected from the group consisting of (a) about 65 to about 99 mole percent methyl methacrylate and about 1 to about 35 mole percent of a hydroxyalkyl acrylate, and (b) about 1 to about 35 mole percent of a hydroxyalkyl acrylate and about 65 to about 99 mole percent of a mixture consisting essentially of monofunctional monoacrylates, monovinyl hydrocarbons, diacrylates, divinyl hydrocarbons, acrylonitrile, methacrylonitrile and vinyl acetate.

7. A radiation-curable paint which on a pigment and mineral filler-free basis comprises a film-forming dispersion of about 30 to about 65 weight percent vinyl monomers and about 70 to about 35 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups selected from divinyl benzene, a diester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and (b) a remainder consisting essentially of an ester of acrylic acid and a $C_2$–$C_8$ monohydric alcohol, said remainder constituting at a minimum about 80 mole percent of the core reactants, and (2) about 90 to about 10 weight percent of an outer shell having a glass transition temperature at least 50° C. above that of said core and consisting essentially of the polymerization product of monomer mixtures selected from the group consisting of (a) about 70 to about 95 mole percent methyl methacrylate and about 5 to about 30 mole percent of a hydroxy-functional acrylate selected from hydroxyethyl acrylate, hydroxyethyl methacrylate, and (b) about 5 to about 30 mole percent of a hydroxy-functional acrylate selected from hydroxyethyl acrylate, hydroxyethyl methacrylate, hydroxypropyl acrylate and hydroxypropyl methacrylate and about 70 to about 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohols and 0 to 30 mole percent of a monomer selected from acrylonitrile, methacrylonitrile and vinyl acetate.

8. A paint in accordance with claim 7 wherein said core is a crosslinked acrylic polymer consisting essentially of butyl acrylate and 1,3-butylene dimethacrylate.

9. A paint in accordance with claim 7 wherein said core is a crosslinked acrylic polymer consisting essentially of 2-ethyl hexyl acrylate and 1,3-butylene dimethacrylate.

10. A paint in accordance with claim 7 wherein said hydroxyalkyl acrylate is selected from hydroxyethyl acrylate, hydroxyethyl methacrylate, hydroxypropyl acrylate and hydroxypropyl methacrylate.

11. A paint in accordance with claim 7 wherein said diisocyanate is toluene diisocyanate.

12. A paint in accordance with claim 7 wherein said vinyl monomers are selected from esters of acrylic or methacrylic acid and a $C_1$–$C_8$ monohydric alcohol, $C_8$–$C_9$ monovinyl hydrocarbons, and 0 to 30 mole percent of a difunctional compound selected from divinyl benzene and diesters of acrylic or methacrylic acid and a $C_2$–$C_6$ dihydric alcohol.

13. A paint in accordance with claim 7 wherein the graded rubber particles used to form said rubber-urethane-acrylate addition product have average diameter in the range of about 0.04 to about 1 micron.

14. A radiation-curable paint which on a pigment and mineral filler-free basis comprises a film-forming dispersion of about 20 to about 90 weight percent vinyl monomers and about 80 to about 90 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups selected from divinyl benzene, a diester of acrylic or methacrylic acid and a $C_2$–$C_8$ dihydric alcohol or a triester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and (b) a remainder consisting essentially of a monofunctional monoacrylate, said remainder constituting at a minimum about 80 mole percent of the core reactants, and (2) about 90 to about 10 weight percent of an outer shell consisting essentially of the polymerization product of monomer mixtures selected from the group consisting of (a) about 65 to about 99 mole percent methyl methacrylate and about 1 to about 35 mole percent of a hydroxyalkyl acrylate, and (b) about 1 to about 35 mole percent of a hydroxyalkyl acrylate and about 65 to about 99 mole percent of a mixture consisting essentially of monofunctional monoacrylates, monovinyl hydrocarbons, diacrylates, divinyl hydrocarbons, acrylonitrile, methacrylonitrile and vinyl acetate.

15. A method of coating a substrate which comprises (A) applying to the surface of said substrate a film of radiation-curable paint which on a pigment and mineral filler-free basis comprises a film-forming dispersion of about 20 to about 90 weight percent vinyl monomers and about 80 to about 10 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxy-alkyl acrylate, said particle of graded rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups selected from divinyl benzene, a diester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and (b) a remainder consisting essentially of a monofunctional monoacrylate, said remainder constituting at a minimum about 80 mole percent of the core reactants, and (2) about 90 to about 10 weight percent of an outer shell consisting essentially of the polymerization product of monomer mixtures selected from the group consisting of (a) about 65 to about 99 mole percent methyl methacrylate and about 1 to about 35 mole percent of a hydroxyalkyl acrylate, and (b) about 1 to about 35 mole percent of a hydroxyalkyl acrylate and about 65 to about 99 mole percent of a mixture consisting essentially of monofunctional monoacrylates, monovinyl hydrocarbons, diacrylates, divinyl hydrocarbons, acrylonitrile, methacrylonitrile and vinyl acetate, and (B) crosslinking said film upon said substrate by exposing said substrate to a beam of electrons having average energy in the range of about 100,000 to about 500,000 electron volts.

16. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 35 to about 65 weight percent vinyl monomers at least a major proportion of which are selected from esters of acrylic or methacrylic acid and a $C_1$–$C_8$ monohydric alcohol and $C_8$–$C_9$ monovinyl hydrocarbons and about 70 to about 35 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of (1) about 10 to about 90 weight precent of a core of crosslinked acrylic polymer consisting essentially of (a) a minor and crosslinking amount of a di- or tri-functional monomer containing 2 or more non-conjugated terminal ethylenic groups selected from divinyl benzene, a diester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and (b) a remainder consisting essentially of a monofunctional monoacrylate, said remainder constituting at a minimum about 80 mole percent of the core reactants, and (2) about 90 to about 10 weight percent of an outer shell having a glass transition temperature at least 50° C. above that of said core and consisting essentially of the polymerization product of monomer mixtures selected from the group consisting of (a) about 70 to about 95 mole percent methyl methacrylate and about 5 to about 30 mole percent of a hydroxy-functional acrylate selected from hydroxyethyl acrylate, hydroxyethyl methacrylate, and (b) about 5 to about 30 mole percent of a hydroxy-functional acrylate selected from hydroxyethyl acrylate, hydroxyethyl methacrylate, hydroxypropyl acrylate and hydroxypropyl methacrylate and about 70 to about 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohols and 0 to 30 mole percent of a monomer selected from acrylonitrile, methacrylonitrile and vinyl acetate.

17. An article of manufacture in accordance with claim 16 wherein the particles of graded-rubber has average diameter in the range of about 0.04 to about 1 micron.

18. An article of manufacture in accordance with claim 16 wherein the particles of graded-rubber have average diameter in the range of about 0.1 to about 0.2 micron.

References Cited

UNITED STATES PATENTS

| | | | |
|---|---|---|---|
| 3,423,481 | 1/1969 | Mizutani | 260—836 |
| 3,437,514 | 4/1969 | Burlant | 260—872 |
| 3,450,796 | 6/1969 | Griffin | 260—885 |
| 3,502,745 | 3/1970 | Minton | 260—881 |
| 3,509,234 | 4/1970 | Burlant | 260—859 |
| 3,528,844 | 9/1970 | Burlant | 117—93.31 |

PAUL LIEBERMAN, Primary Examiner

U.S. Cl. X.R.

260—77.5 CR, 859, 885